Sept. 24, 1968 G. DIRKS 3,403,385

MAGNETIC STORAGE DEVICE

Original Filed March 30, 1955 12 Sheets-Sheet 1

INVENTOR
Gerhard Dirks
BY Michael S. Striker
ATTORNEY

Sept. 24, 1968 G. DIRKS 3,403,385

MAGNETIC STORAGE DEVICE

Original Filed March 30, 1955 12 Sheets-Sheet 2

INVENTOR
Gerhard Dirks
BY Michael S. Striker
ATTORNEY

MAGNETIC STORAGE DEVICE

INVENTOR
Gerhard Dirks
BY Michael S. Striker
ATTORNEY

INVENTOR
Gerhard Dirks
BY Michael S. Striker
ATTORNEY

MAGNETIC STORAGE DEVICE

Original Filed March 30, 1955 12 Sheets-Sheet 5

INVENTOR
Gerhard Dirks
BY Michael S. Striker
ATTORNEY

MAGNETIC STORAGE DEVICE

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

INVENTOR
Gerhard Dirks
BY Michael S. Striker
ATTORNEY

Sept. 24, 1968 G. DIRKS 3,403,385

MAGNETIC STORAGE DEVICE

Original Filed March 30, 1955 12 Sheets-Sheet 10

INVENTOR
Gerhard Dirks
BY Michael S. Striker
ATTORNEY

INVENTOR
Gerland Dirks
BY Michael S. Striker
ATTORNEY

INVENTOR

BY

ATTORNEY

United States Patent Office 3,403,385
Patented Sept. 24, 1968

3,403,385

MAGNETIC STORAGE DEVICE

Gerhard Dirks, 12120 Edgecliff Place, Los Altos Hills, Calif. 94022

Application Apr. 26, 1961, Ser. No. 107,283, now Patent No. 3,228,007, dated Jan. 4, 1966, which is a continuation of application Ser. No. 498,047, Mar. 30, 1955, which in turn is a continuation-in-part of application Ser. No. 101,032, June 24, 1949. Divided and this application Oct. 23, 1965, Ser. No. 503,685
Claims priority, application Germany, Oct. 1, 1948, P 11,464; Great Britain, Dec. 23, 1954, 37,214/54
11 Claims. (Cl. 340—172.5)

ABSTRACT OF THE DISCLOSURE

A selective data storage arrangement comprising first magnetic data signal storage means including reading means, second data signal storage means including writing means, transmitting means interconnecting said reading and writing means. The arrangement further includes selective electronic gating means comprising at least two electronic gating elements which are rendered conductive in a selective manner.

This application is a division of my application Ser. No. 107,283, now Patent No. 3,228,007, filed Apr. 26, 1961, entitled, "Magnetic Storage Device," which application Ser. No. 107,283, in turn, is continuation application of my application Ser. No. 498,047, filed Mar. 30, 1953 and entitled "Magnetic Storage Devices," which application Ser. No. 498,047, in turn, is a continuation-in-part of my application Ser. No. 101,032, filed June 24, 1949, entitled, "Electronic Office Machine With Computing-, Indicating-, Printing-, Storing- and Sorting-Mechanisms."

The invention relates to magnetic storage devices with which the recording, sensing and erasing of signals is effected by signal heads.

A magnetic storage device makes use of a magnetizable record means as a signal carrier, which has or is provided with a magnetizable record material which will record sensible signals by changes of the magnetic state of the said record material.

The present invention provides a selective magnetic storage means comprising a rotation-symmetrical magnetizable signal carrier and signal sensing and/or recording means therefor, with relative cyclic movement between said signal carrier and said means, together with means whereby signals may be transferred selectively to or from the said signal carrier by said means.

The rotation-symmetrical magnetizable signal carrier may be the magnetizable layer or surface of a drum or of a disc or the like. The recording means will include at least one signal head but usually there will be a plurality of signal heads and these will be displaced relatively to each other, for instance axially or circumferentially in the case of a drum, and radially or circumferentially in the case of a disc. In both cases the circumferential distance will be a whole multiple of the extent of displacement between signal heads. A means may be provided whereby signals or groups of signals may be recorded and/or sensed on a basis of locality or on a basis of time.

Sensing means for synchronizing signals may also be provided, and such synchronizing signals may be recorded as remanent or permanent signals on a signal carrier. The synchronizing signals may be magnetizably recorded, or they may be recorded optically or photographically. Additional selecting means may be provided including distributing means operating under the control of such synchronizing signals, and such distributing means may be an electrically actuating or electronically actuating distributing means.

The selecting means for selective transfer of signals between the signal carrier and the sensing or recording means may be adapted for operation in dependence on a selection program of any kind, including those adapted for handling addresses, information, control and/or selection signals and auxiliary or supplementary signals. By such means, it is possible, as explained more fully hereinafter, to consider the magnetizable surface as representing so many punched cards, to select in a manner equivalent to the sorting of punched cards.

One of the special advantages of the selective storage means is the possibility of a combination with computing, printing and/or indicating devices and the like. These selective storages may either contain changeable impulses, which can be sensed, erased and renewed at recording, or may be fixed impulse sequences, containing charts, tables, reference information and the like. The selective storages allow the sensing of any adjusted position of the storage and the transfer of impulses between that position and a computing, printing and/or indicating device and the like, in a fraction of a second.

In order that the invention may be readily carried into effect, it will now be described with reference to the accompanying drawings, wherein.

Figure 3:
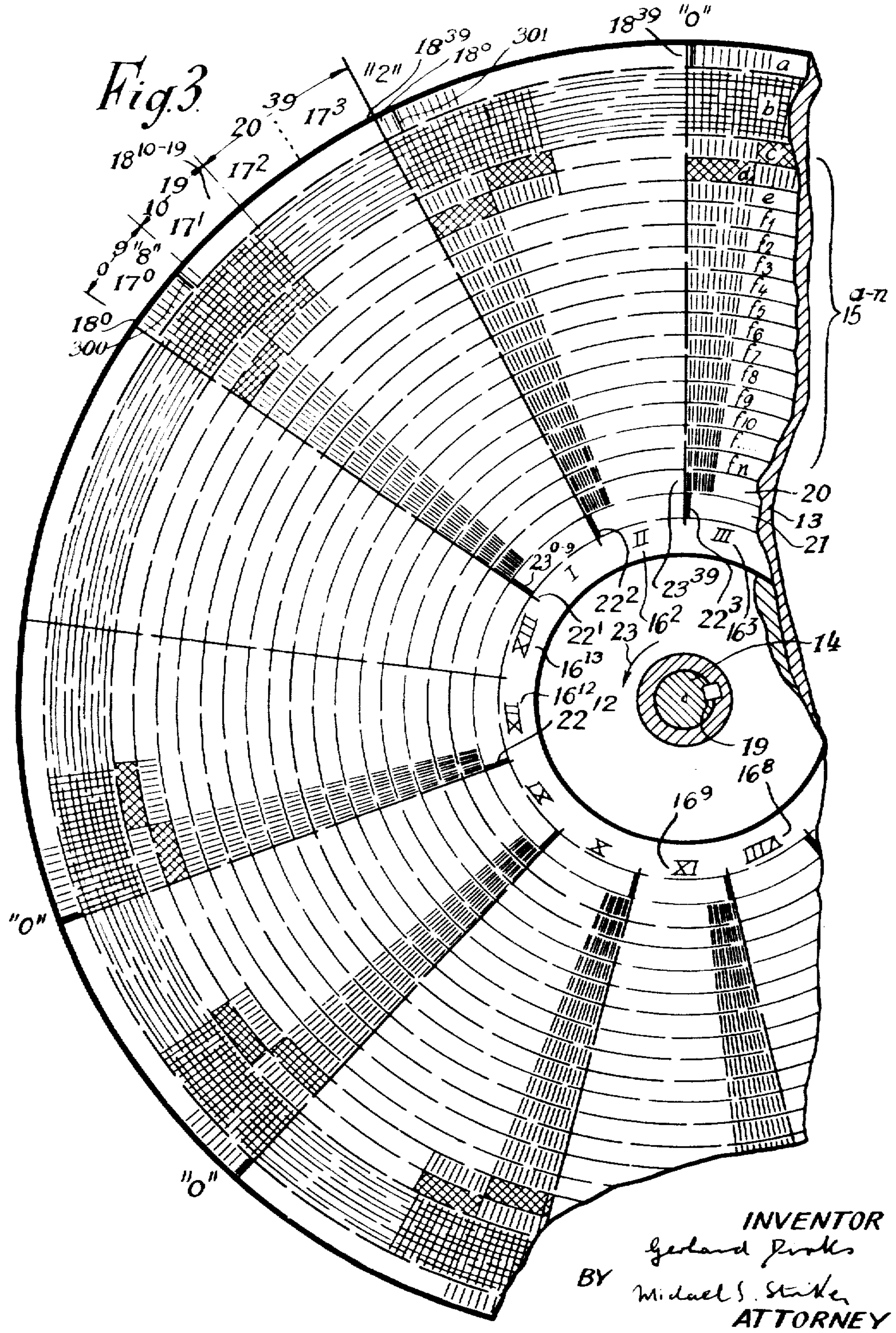
FIG. 3 is a view in axial direction of one half of a magnetic storage disc, formed as a magnetizable signal carrier, the markings shown being purely for the purpose of explanation.
Figures 4A, 4B, 4C, 4D, 4E:
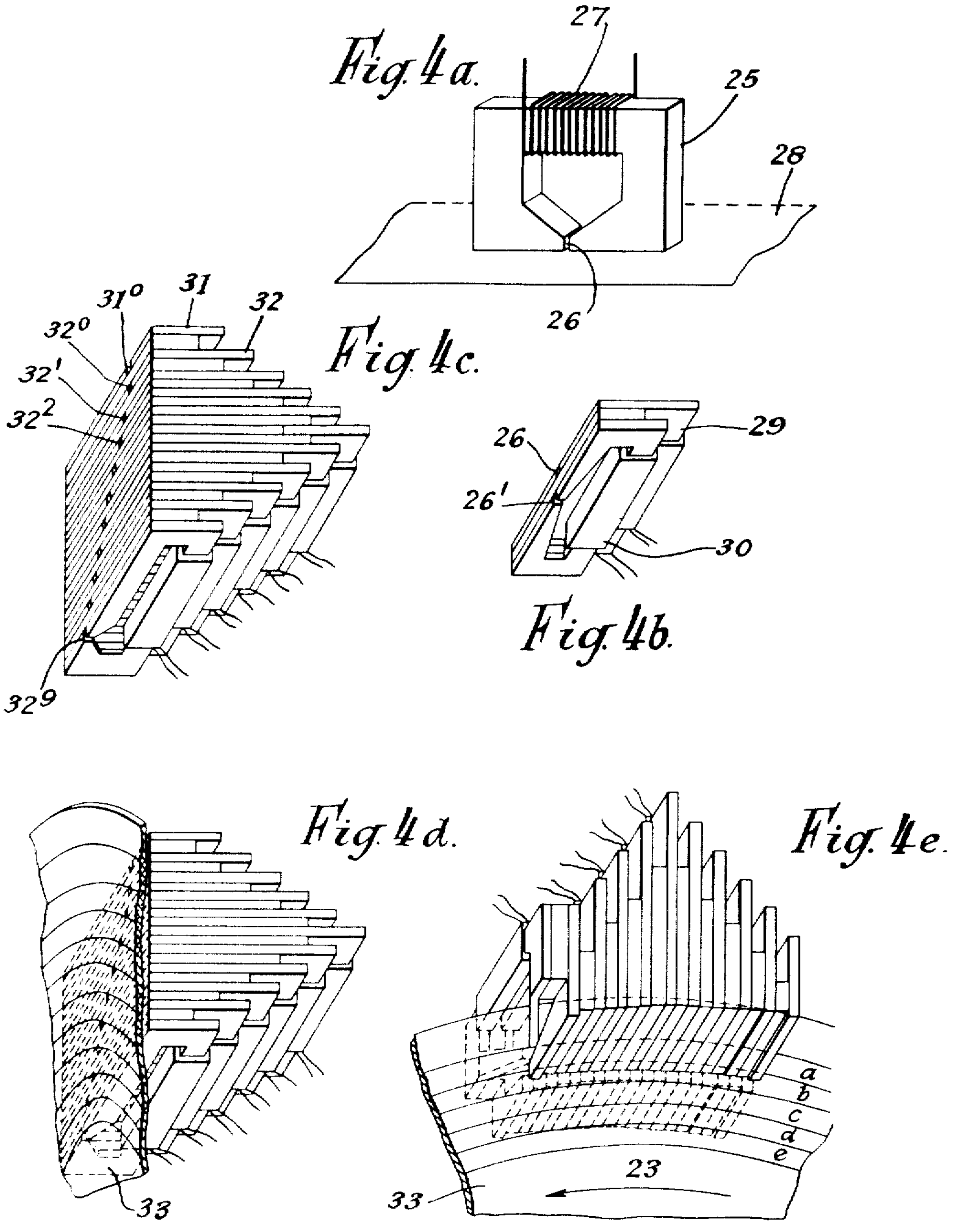
Figures 5A, 5B:
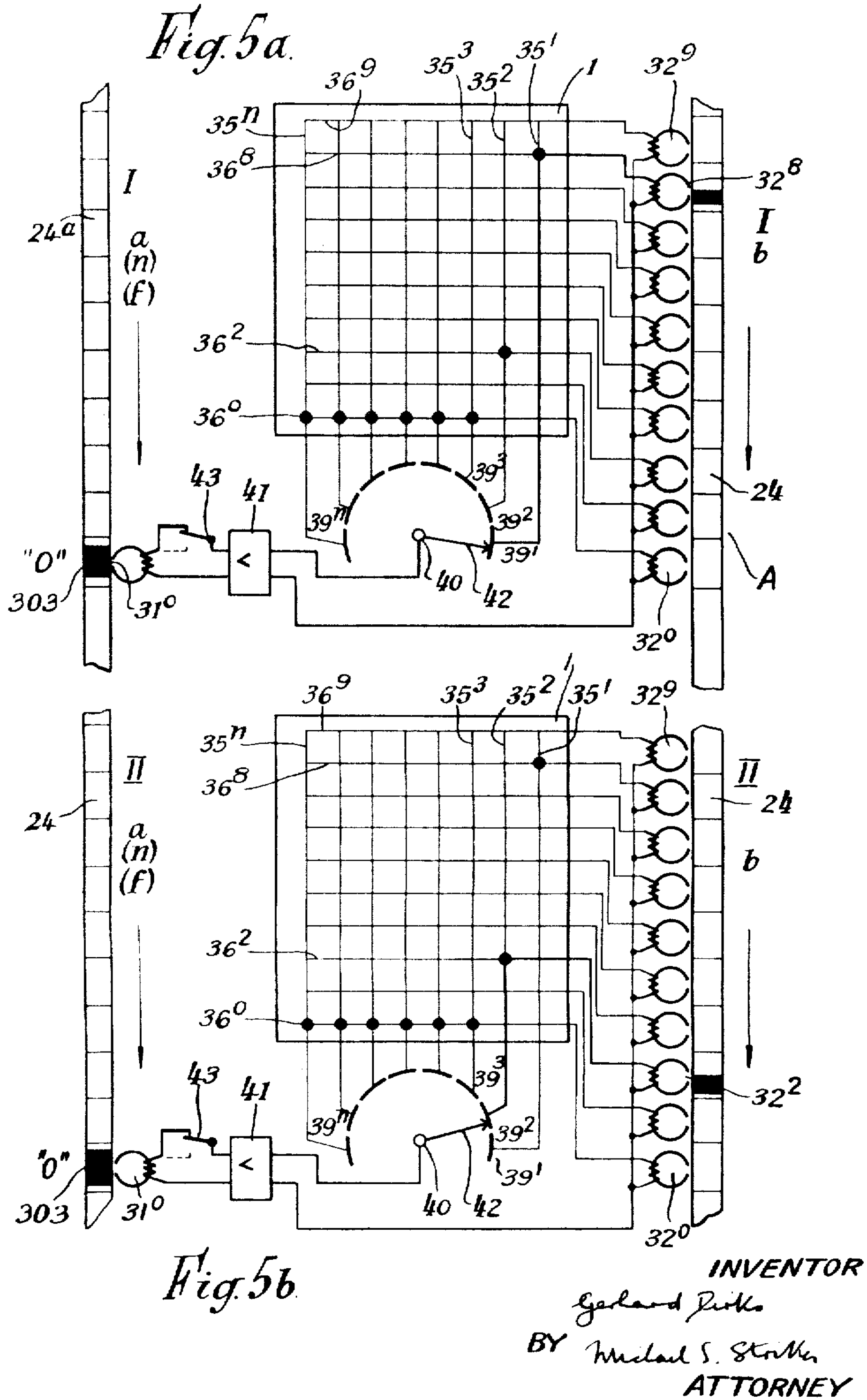
Figures 6A, 6B:
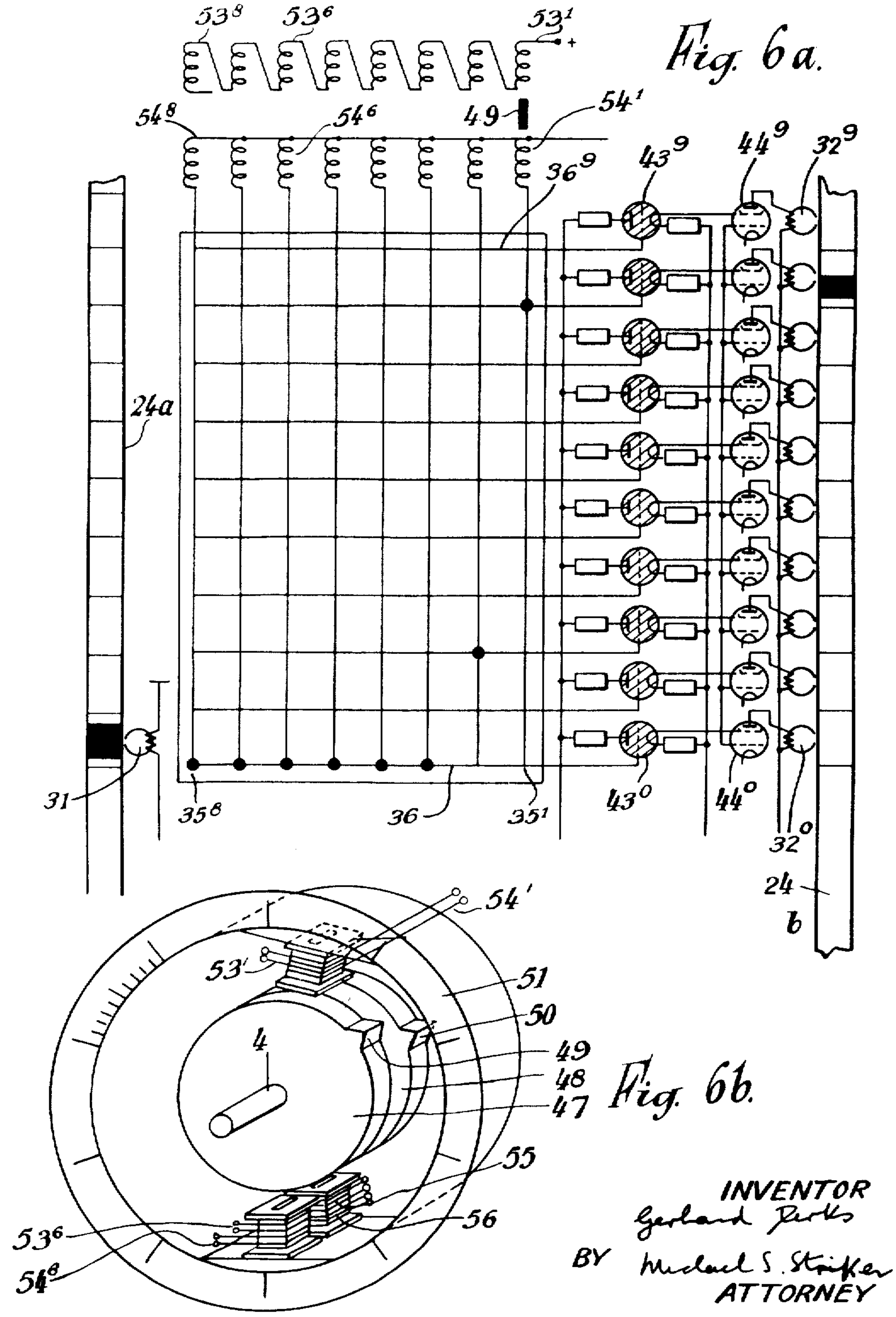
Figure 7:
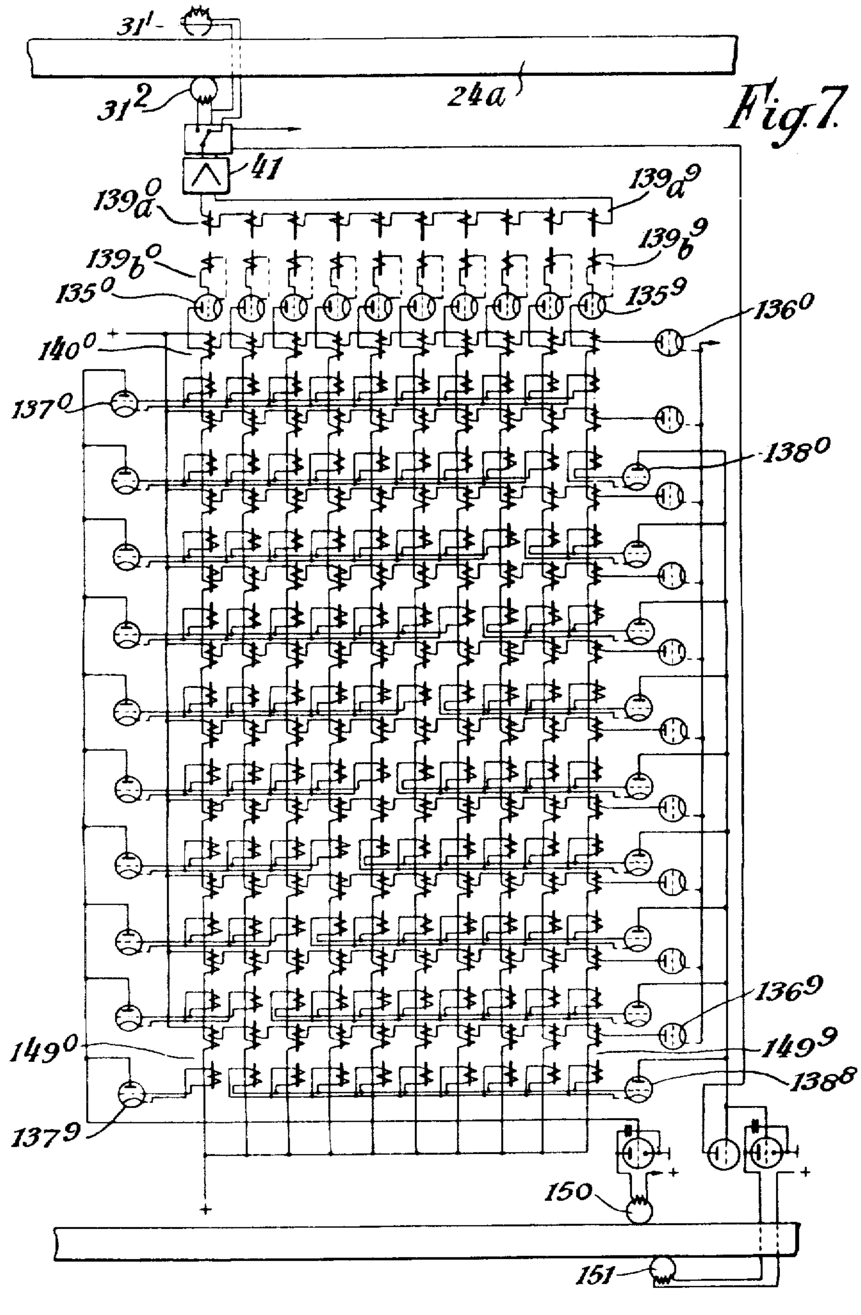
Figure 8:
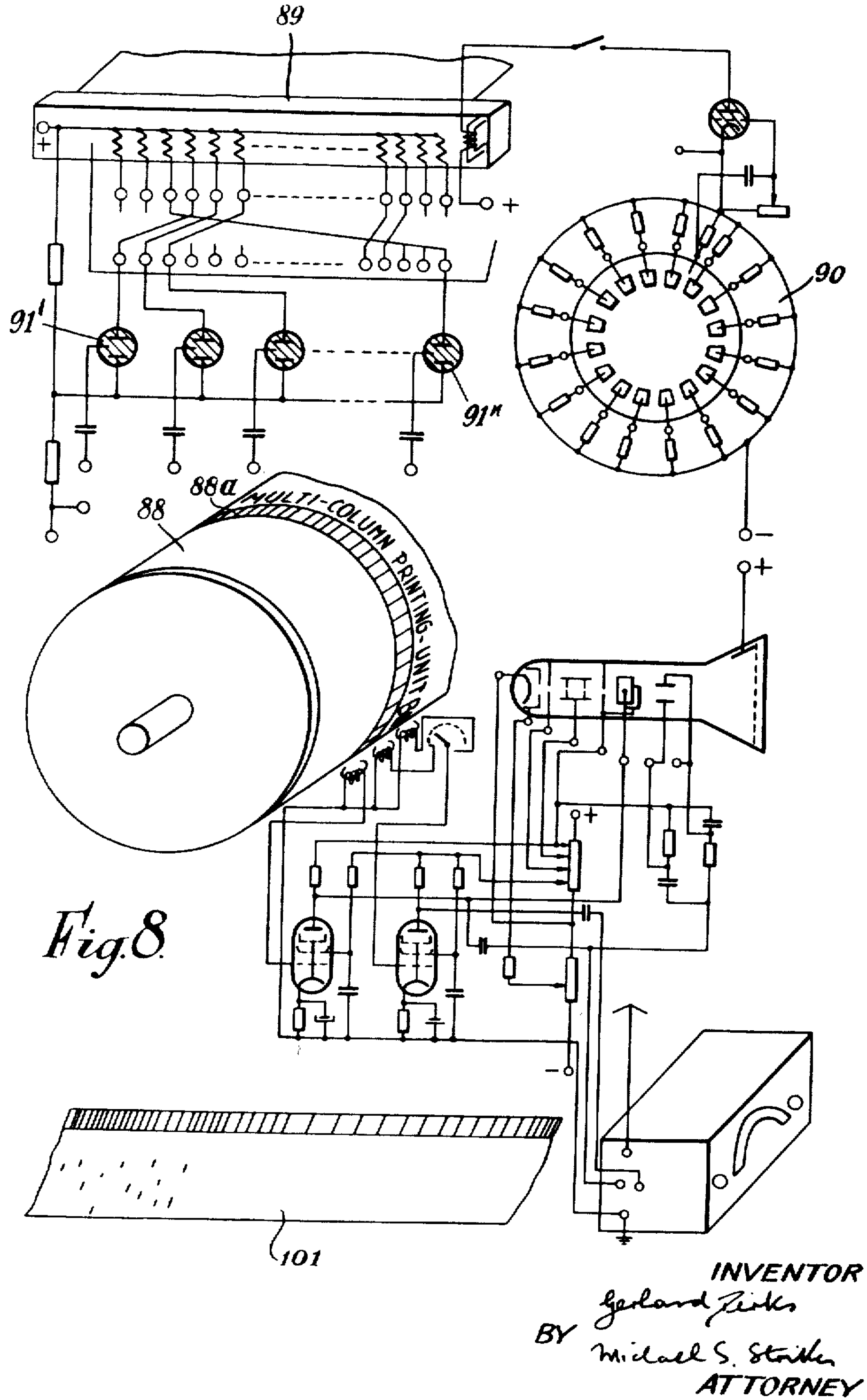
Figures 9, 11B:
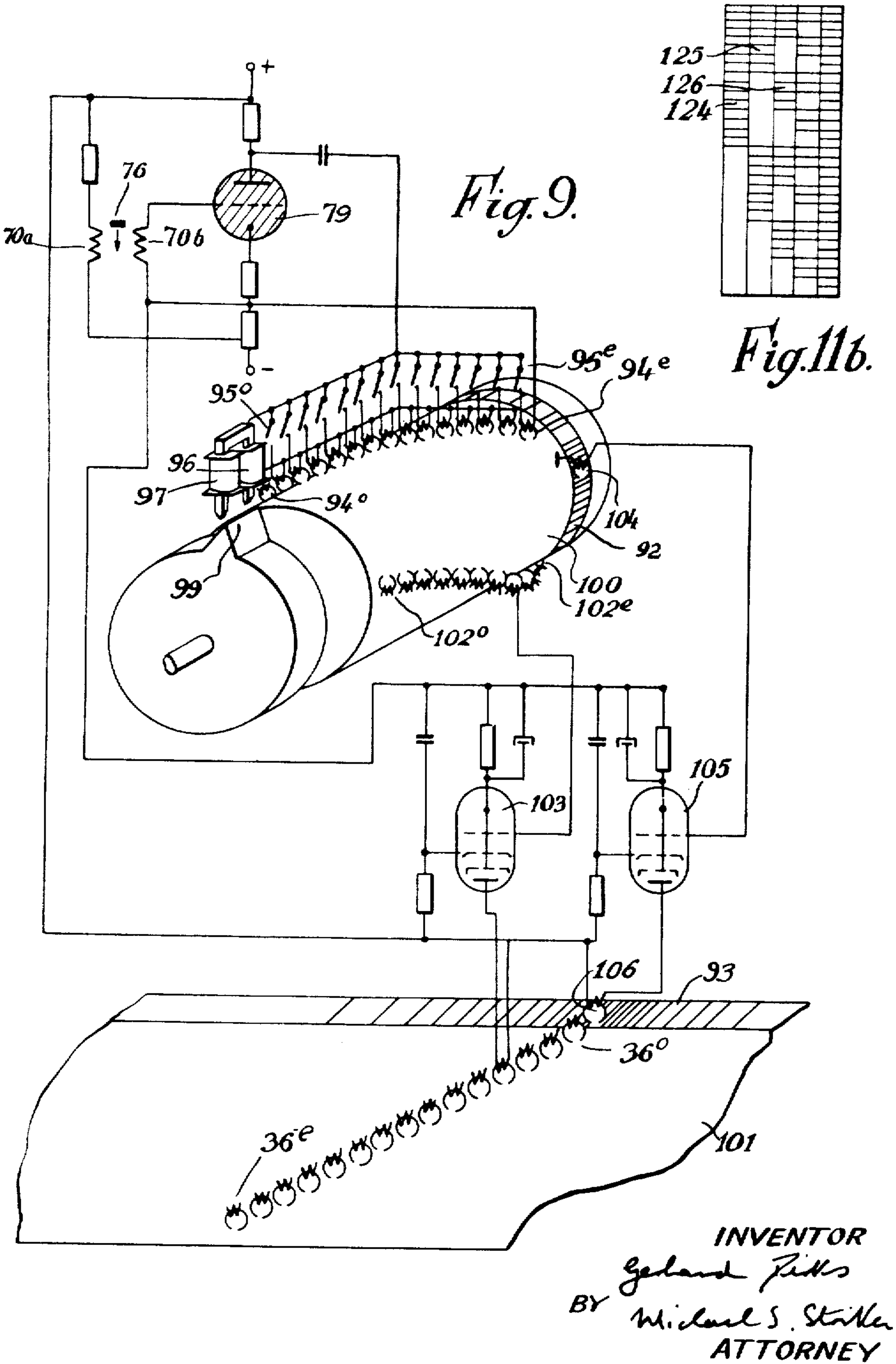
Figure 10A:
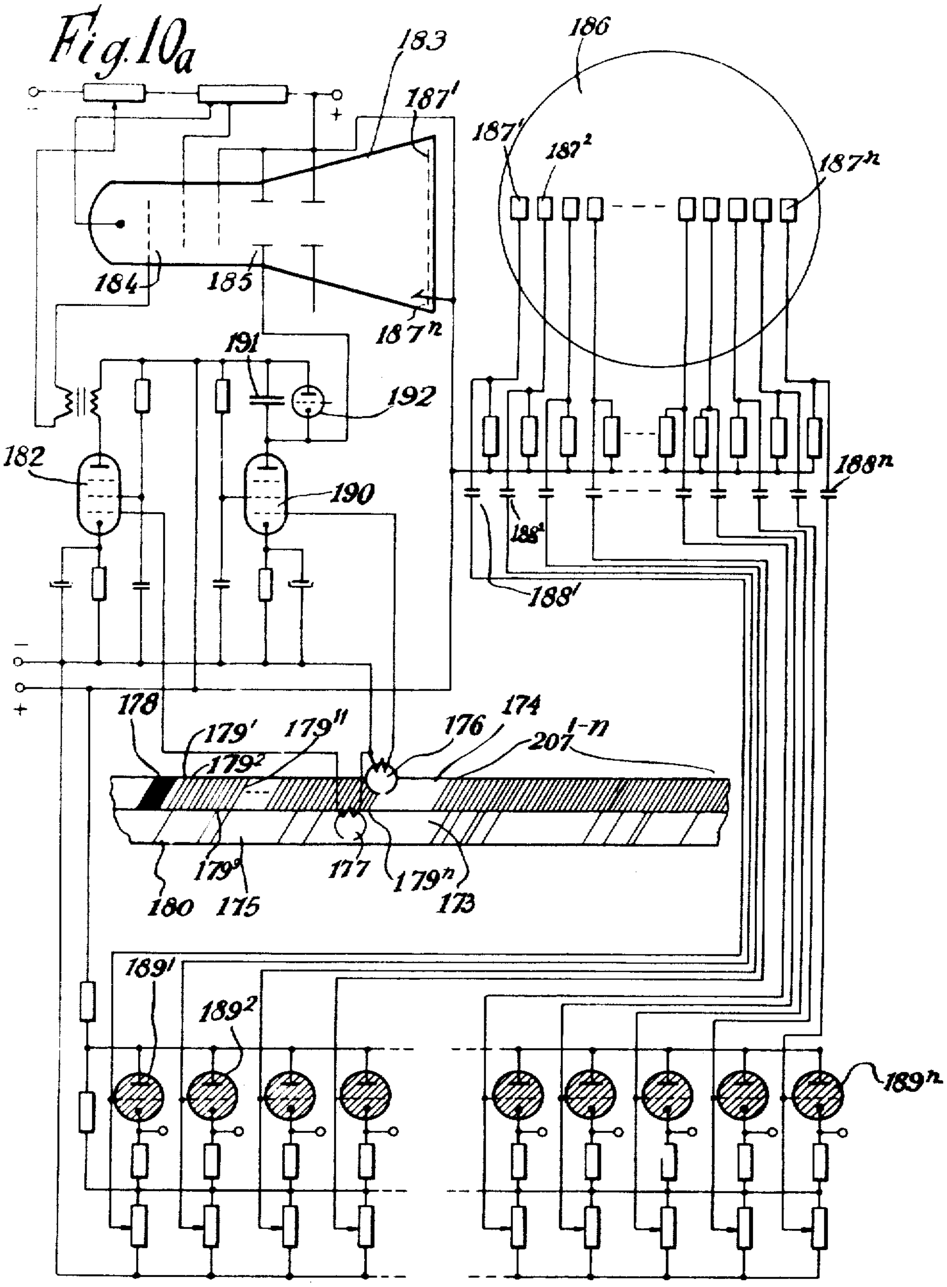
Figure 10B:
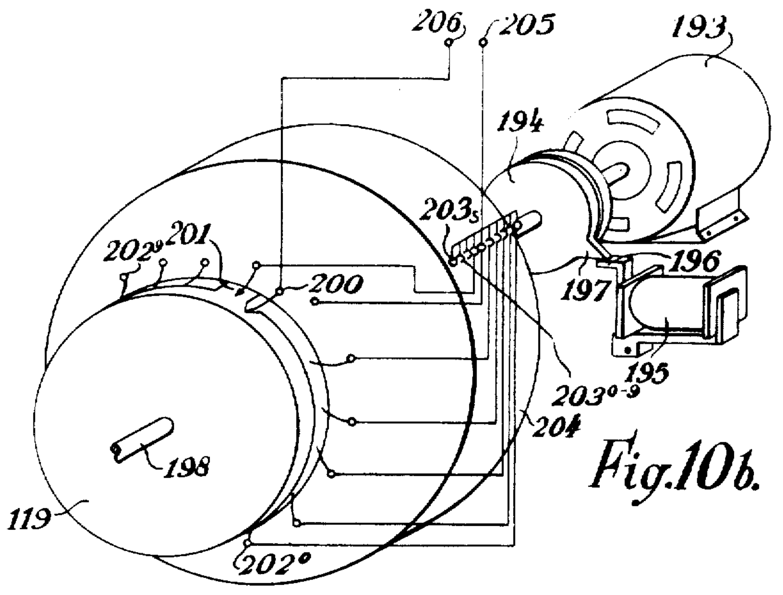
Figure 11C:
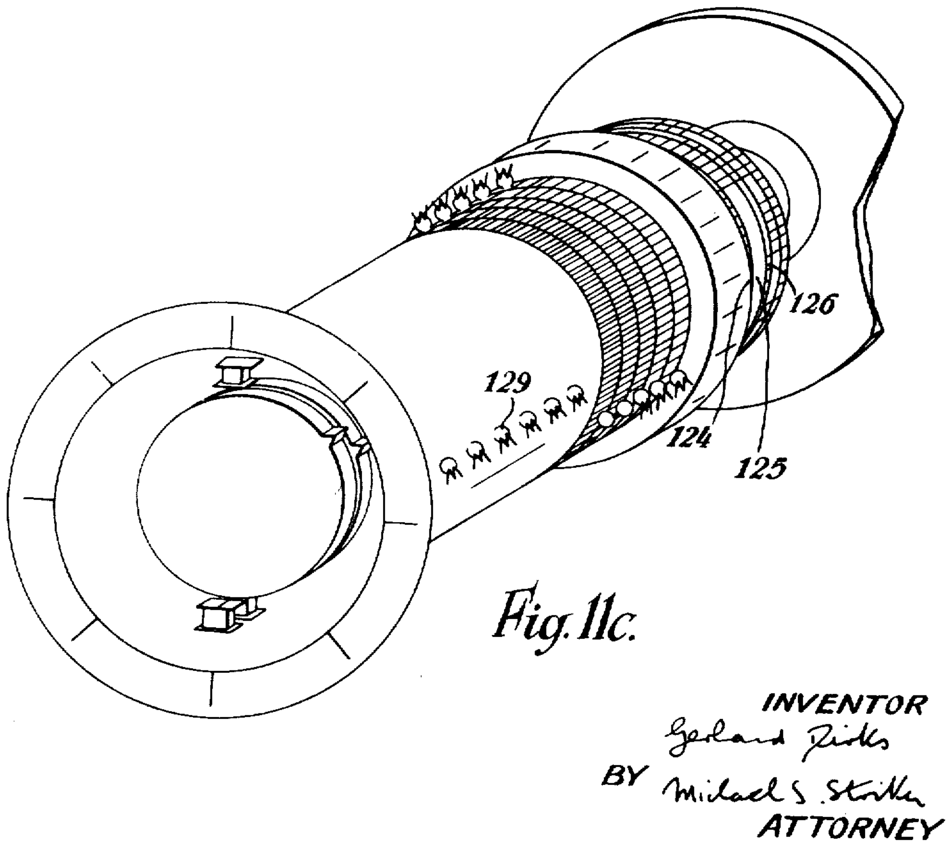
Figure 10C:
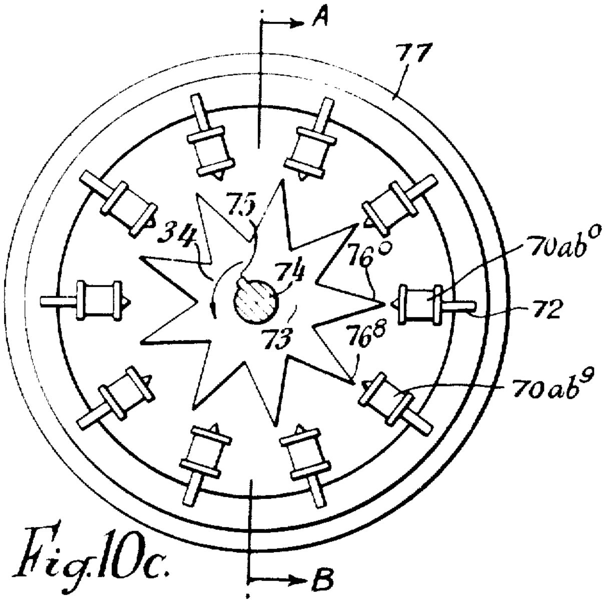
Figure 10E:
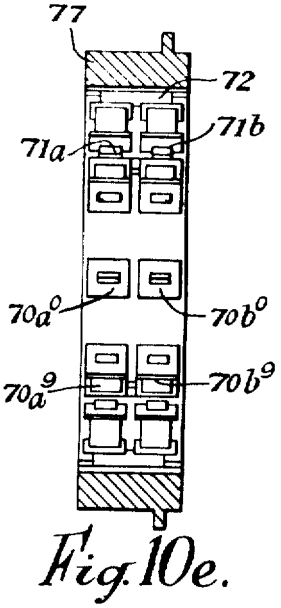
Figure 10F:
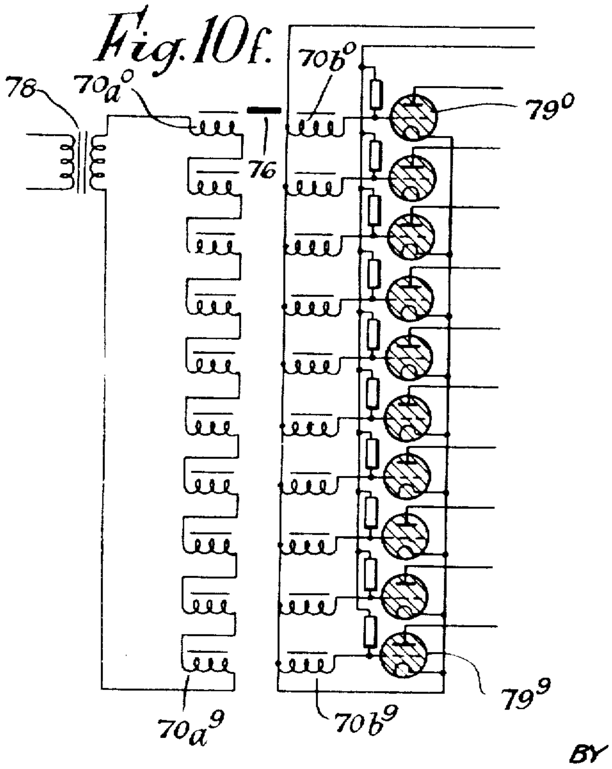
Figure 10D:
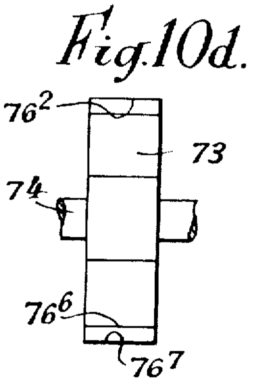
Figure 11A:
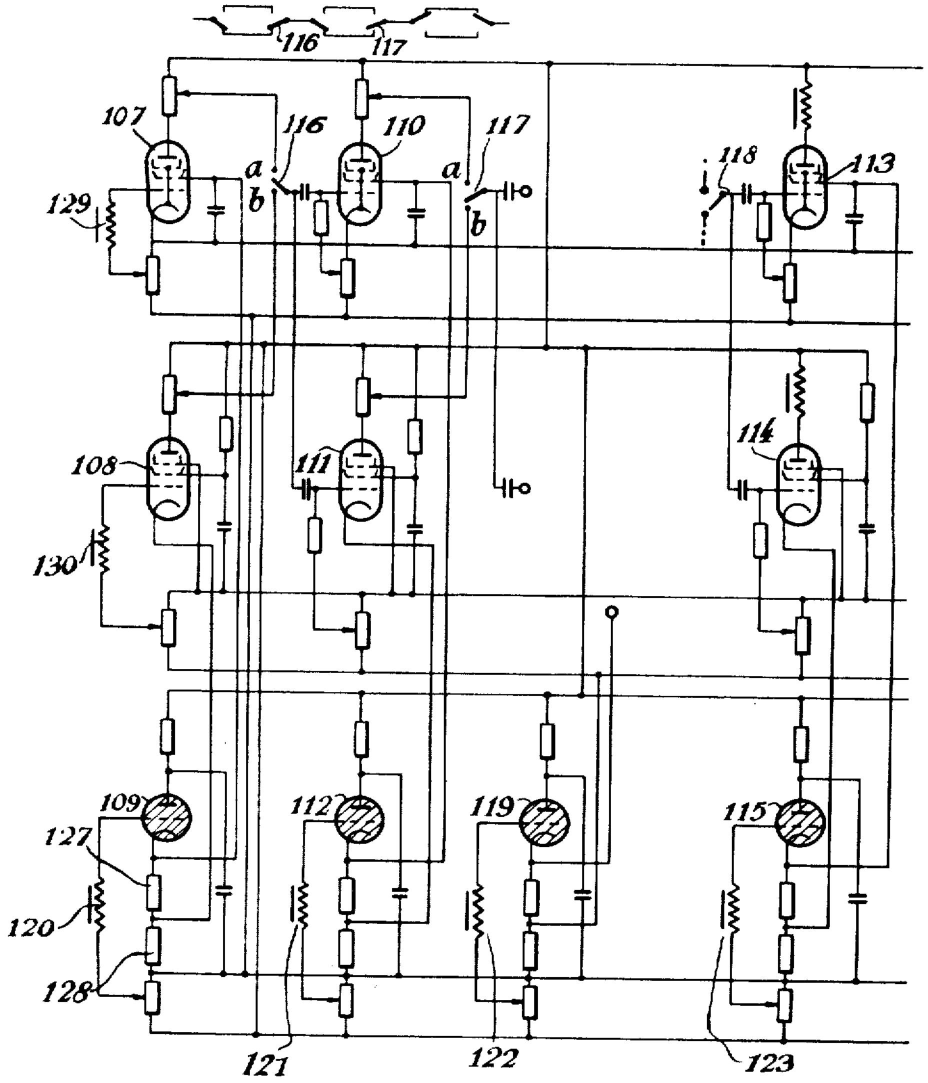

FIG. 4*a* is a perspective view of an embodiment of a magnetic signal head, for example a sensing head on a magnetizable carrier;

FIG. 4*b* is a perspective view of an embodiment of a set of heads consisting of two magnetic heads for the forwarding of a signal with change of digit value by "one";

FIG. 4*c* is a perspective view of an embodiment of a set of signal heads consisting of 11 magnetic heads for transfer of computing signals in dependence on the operation of numerical value switches or the like;

FIG. 4*d* is a perspective view illustrating a set of signal heads of the embodiment of FIG. 4*c* in association with a disc of the embodiment of FIG. 3;

FIG. 4*e* is similar to FIG. 4*d* showing another embodiment of a set of heads consisting of 11 magnetic heads, which in this case embrace the disc at its edge;

FIGS. 5*a*, *b* are schematic diagrams showing displaced signal heads under the control of a selective program input means;

FIG. 6*a* is a schematic diagram of a series of displaced signal heads, electronically controlled from a selective program input means;

FIG. 6*b* is an embodiment of a magnetically operated sector or switch;

FIG. 7 is a schematic diagram showing the use of magnetic gates for a selective control of signal heads, indicating e.g. denomination-values and digit values represented in selective tables;

FIG. 8 is a schematic circuit diagram showing the use of a magnetic drum with selective distributing means controlled electrically by signals in a synchronizing track and the possibility of transfer or re-transfer in a similar arrangement to magnetic tapes;

FIG. 9 is a schematic circuit diagram similar to FIG. 8 with a number of signal heads operating in parallel and wherein the signals may be transferred to or from the tape in a selective manner with or without re-arrangement, and with the simultaneous transfer of synchronizing and information signals;

FIG. 10*a* is a schematic circuit diagram of an embodiment of an arrangement for the switching control of a set of relay tubes by a stepwisely movable tape or other record means having one synchronization and one information track;

FIG. 10*b* is a diagram of an embodiment of stepwisely operable cyclic storage means with magnetizable layer for selective or repeated sensing of signals transferred from the tape of FIG. 10*a* to the said magnetizable record means;

FIG. 10*c* is a view in the axial direction of a magnetically operating distributor;

FIG. 10*d* is a view of the rotor of the distributor of FIG. 10*c*;

FIG. 10*e* is a section on the line A—B of the distributor of FIG. 10*c*;

FIG. 10*f* is a circuit diagram of an embodiment of an arrangement for the control of gas discharge tubes by the distributor of FIG. 10*c*;

FIG. 11*a* is a schematic circuit diagram of an embodiment of an arrangement for selective comparing means for addresses for binary numbers of several denominations;

FIG. 11*b* is a development of a cylindrical part of the embodiment of FIG. 11*a* with means for a binary address in several denominations;

FIG. 11*c* is a perspective view of an embodiment of a magnetic drum storage with selective sensing and recording means under the control of signals forming a multi-denomination address.

Figure 1:
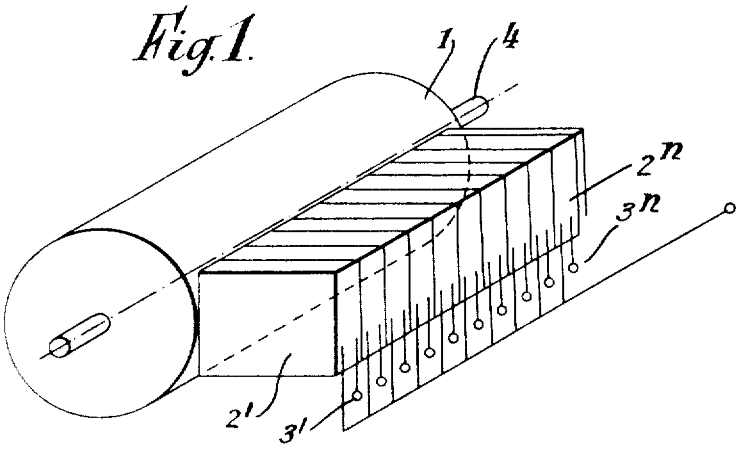
FIG. 1 is a perspective view of a rotatable magnetic storage drum with one arrangement of sensing means.

In FIG. 1, the rotation-symmetrical signal carrier is shown as rotatable drum 1, the circumferential surface of which has or is provided with a magnetizable layer adapted for the storage of signals by a change of the magnetizable state of the material of such layer. There is shown also a plurality of signal head casings $\mathbf{2}^{1-n}$ arranged side-by-side and each containing one or more signal heads or systems of signal heads.

Figure 2:
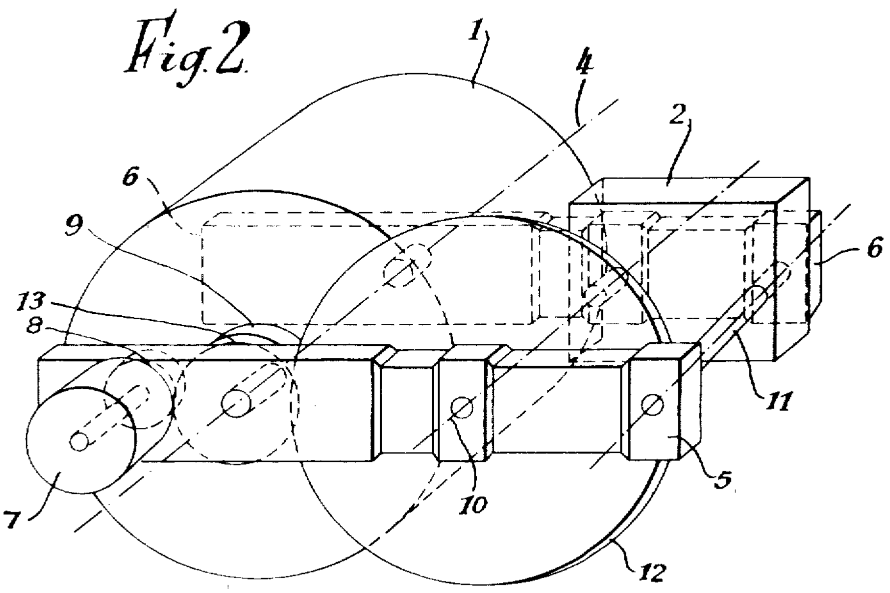
FIG. 2 is a schematic perspective view of a magnetic storage drum with movable magnetic heads.

In FIG. 2, the rotation-symmetrical signal carrier is likewise a rotatable drum 1, and a single signal head casing 2 is shown which may move axially of the drum.

In both cases, by reason of the relative rotation between the drum and the signal heads, these heads trace out on the drum side-by-side signal tracks and in each rotation, all the signals in a track will pass the signal heads which then lie opposite the track.

In order that the selective storage means shall have a rapid access, that is, in order for any part of the storage surface to be brought to a signal head in the least possible time for the sensing and/or recording or erasing of signals, it is necessary to select an appropriate part of a particular track. This involves a selection in a direction axially of the drum and a selection circumferentially of the drum, either of which selections may be carried out in different ways. If, for instance, a plurality of signal heads or signal head systems is disposed around the drum, the degree of angular displacement of the drum necessary to select a particular signal is reduced, and the access time is correspondingly shortened.

For the selection of a track from the several side-by-side tracks, the switching circuits of a plurality of side-by-side signal heads arranged axially of the drum may be made effective selectively. This arrangement is illustrated diagrammatically in FIG. 1, where the signal head casings are indicated at $\mathbf{2}^{1-n}$ and the connections to the switching circuits are indicated at $\mathbf{3}^{1-n}$. Alternatively, one or more signal heads may be moved axially of the drum to effect track selection. This arrangement is illustrated diagrammatically in FIG. 2.

Referring to FIG. 1 in more detail, the drum 1 is mounted for rotation about the axis 4 by means not shown, and may have a speed of, for example, up to 6,000 r.p.m. With a drum of a diameter of for example, 7 to 10 inches, each circumferential signal track may contain between 1,000 and 5,000 signals, and with a drum of a length from 6 to 12 inches there may be for example 100 signal tracks.

In order to avoid wear on the drum surface and on the signal heads at such speeds, and in order to make possible the recording and/or sensing of the required number of signals in a track, the signal heads are spaced from the drum surface, the extent of such spacing being dependent on the one hand on eliminating friction and on the other hand allowing required sub-division of the circumferential track into the required number of areas for recording the required number of signals.

In the arrangement illustrated in FIG. 2, the drum 1 is carried on a shaft 4 which is mounted in brackets 5 and 6, and is adapted to be driven by a motor 7 through gear and clutch means indicated at 8 and 9, whereby the rotation of the drum may continuous or intermittent, as desired. In the brackets 5 and 6 there are also mounted another shaft 10 and a guide rod 11, and these (shaft 10 and rod 11) carry the casing 2 containing the signal head or heads.

At the one end of shaft 10 is a gear 12 which is adapted to be rotated by gear and clutch means 13 for continuous or intermittent operation, and the gear 12 is connected with means such as cam, or screw and nut mechanism whereby its rotation effects a corresponding lateral movement of the casing 2, this movement being continuous or intermittent selectively as determined by an operation of the clutch. Clutch and gear 9 and 13 are both driven by the motor 7.

By a selective operation of the drives to the drum and the member 8, a direct access to any part of the drum surface by the signal heads may be realized in a short time, to select any of the tracks. If side-by-side signal heads are shifted laterally, a group of tracks may be selected by the selective switching-on of signal heads and a further selection may be achieved by a lateral shifting. When the tracks are arranged longitudinally to the drum, the signal heads may have cyclic shifting movement and the drum may have an intermittent rotation, whereby any of such tracks may be selected for sensing by one or a group of signal heads.

In some cases the drum may have a cyclic rotation and the casing 2 an intermittent movement, while in other cases the situation may be reversed.

In the embodiment of FIG. 3, where the signal carrier is a disc 13, the side-by-side tracks are concentric rings and the signal heads have a radial displacement or movement instead of an axial displacement or movement. The same selective combinations of continuous and intermittent movements may be carried out as described in connection with the drum in FIGS. 1 and 2.

The disc 13 is mounted on the shaft 14 for rotation therewith and its magnetizable surface may be regarded as (imaginatively) divided into the said concentric tracks $\mathbf{15}^{a-n}$ and also into sectors between radial lines, for instance the sectors $\mathbf{16}^{1-13}$. Within each sector the tracks $\mathbf{15}^{a-n}$ are regarded as divided into sub-sections, e.g., $\mathbf{17}^{0-3}$, and also as divided into 40 storage locations $\mathbf{18}^{0-39}$. Each of such storage locations is a locality for the recording, sensing and/or erasing of signals, for example digit value signals. Such signals have a definite local relationship to precise points on the shaft or disc, for instance a precise relationship with the angular position of the keyway 19, or they may have a precise relationship with signals recorded as synchronizing signals in one or more tracks, for instance the tracks 20, 21, such synchronizing signals being either again in definite local relationship to precise points on the shaft or disc, or themselves forming the time base for a time-base signal generator, operating in synchronism with the relative movement between them and sensing means provided for the sensing of such signals.

Such synchronizing signals are provided within track 21 once only within each sector namely at the beginning of the sector (in the arrow-direction of rotation 23) and are indicated as strokes $\mathbf{22^1}$, $\mathbf{22^2}$, $\mathbf{22^3}$, $\mathbf{22^{12}}$, etc. In track 20, synchronizing signals $\mathbf{23^{0-9}}$ are provided for the controlled selective sensing, recording and/or erasing of signals or groups of signals within the respective fields $\mathbf{18^{0-9}}$ in the different tracks $\mathbf{15^{a-n}}$ of each of the sectors $\mathbf{16^{1-13}}$.

Such synchronizing signals may also be supplied to a comparison device comparing them with other synchronizing signals delivered from another signal generator and the result of the comparison may be made to control the speed of the driving means for the record means.

The recording, sensing and erasing of the magnetic signals on and from the disc can be carried out in any manner known from magnetic tape sound technology and the like. Examples of signal heads and their manner of use are illustrated in FIGS. *4a–4e*.

Each of the concentric tracks such as $\mathbf{15^{a-n}}$ on the disc 13 may be used for the storage of one multi-denominational decimal number. One digit of such a number is stored in each of the sectors 16. Each digit is represented by a signal recorded in one of the storage locations of a sector. For example, a signal 300 is recorded in track **15*a*** in the storage location $\mathbf{18^8}$ of sector $\mathbf{16^1}$. This signal represents the decimal eight because it is recorded in storage location $\mathbf{18^8}$, that is, the value which a recorded signal represents corresponds to the suffix number of the storage location in which it is recorded. Similarly, signal 301 in storage location $\mathbf{18^2}$ of sector $\mathbf{16^2}$ represents the decimal digit two. The least significant digit of a number is recorded in sector $\mathbf{16^1}$, the next digit in sector $\mathbf{16^2}$, and so on, the most significant digit of a twelve digit number being recorded in sector $\mathbf{16^{12}}$. Sector $\mathbf{16^{13}}$ is not used for digit recording and the passage of this sector past the various magnetic heads which may be associated with the disc provides a time in which the section of particular heads, and similar switching operations, may be performed.

Referring again to FIG. 1, there is shown a plurality of signal heads which may be made effective selectively and which trace circumferential tracks on a drum. In FIGS. *5a* and *5b* the track 24 at the right hand side represents a part of one of such tracks.

FIGS. *5a* and *5b* show that a plurality of signal heads $\mathbf{32^{0-9}}$ is provided displaced relatively to each other lengthwise of the track, namely in positions circumferentially of the drum. The separation between adjacent heads is equal to the separation between adjacent storage locations. These signal heads are selectively switchable in dependence on a control mechanism including a rotatable sector switch having contacts $\mathbf{39^1}$–$\mathbf{39^n}$ and a rotating contact arm 42 mounted on a pivot 40. The sector switch operates in synchronism with the rotation of the drum whereby at any given time instant in a cycle of rotation any one of the signal heads $\mathbf{32^{0-9}}$ may be made effective selectively under the control of a selective input device.

In FIGS. *5a* and *5b* the sector switch is shown as having its contacts $\mathbf{39^{1-n}}$ connected to the vertical rows of electrical contacts a full keyboard in which the horizontal rows $\mathbf{36^{0-9}}$ of electrical contacts are connected to one end of the respective signal head windings, the other ends of the windings being connected in parallel to an amplifier circuit 41, to which also the contact arm 42 is connected. The amplifier circuit 41 amplifies signals sensed by sensing head 31 from a signal track **24*a* which is on the same signal carrier as the track 24**. The arrangement illustrated in FIGS. *5a* and *5b* is described in detail in my copending patent application Ser. No. 432,093, filed May 25, 1954 and now abandoned.

Briefly, when a recorded signal, such as 303, passes the gap of the head $\mathbf{31^0}$ a voltage impulse is induced in the head winding. This voltage impulse is passed by switch 43 to the input of the amplifier 41. This produces a corresponding output from the amplifier which passes via the switch arm 42, contact $\mathbf{39^1}$ (FIG. *5a*), and a closed contact of the keyboard, represented by the marked junction, to the winding of head $\mathbf{32^8}$. Hence the head $\mathbf{32^8}$ is energized to record a signal in a storage location of the track 24. The track 24 is divided into sectors in a manner similar to that of the tracks 15 on the disc 13. The track **24*a* has a signal such as 303 recorded at the beginning of each sector. The positioning of the heads 32 is such that the signal recorded by the head $\mathbf{32^8}$ will be in the eighth storage location. It will be apparent that with the switch arm 42** in the position shown in FIG. *5b*, a signal will be recorded by the head $\mathbf{32^2}$ in the second storage location. The movement of the switch arm is synchronized with the movement of the storage drum, so that a different sector of the drum is beneath the heads 32 each time the switch arm 42 makes contact with a different one of the contacts 39.

Instead of an electro-mechanical sector switch, a magnetically operated distributing means may be used as shown for example at $\mathbf{53^{1-8}}$ and $\mathbf{54^{1-8}}$ in FIG. *6a*. Further, instead of a full keyboard, electric or electronic relays in varying forms may replace the keyboard control contacts as described in more detail in my co-pending patent application Ser. No. 432,093 filed May 25, 1954 now abandoned, and described in some forms below.

Such electronic relays are illustrated in FIG. *6a* as gas discharge tubes $\mathbf{43^{0-9}}$, each controlling the respective pentodes $\mathbf{44^{0-9}}$, the anodes of which are connected to the several signal heads $\mathbf{32^{0-9}}$.

The signals from the head $\mathbf{31^0}$ are applied to the other controlling grids of the pentodes $\mathbf{44^{0-9}}$ in common. Hence, an individual pentode produces an output signal only when the associated gas tube is conducting and the head $\mathbf{31^0}$ generates a signal.

In FIG. *6b* there is shown the construction of the magnetically operated sector switch comprising rotatable members 47, 48 mounted on the shaft 4 which carries the storage drum and having projections 49, 50 respectively. One pair $\mathbf{53^6}$ and $\mathbf{54^6}$ of the primary and secondary coils 53, 54, which cooperate with the projection 49 is shown. Another pair of primary and secondary coils 55, 56 is shown cooperating with the projection 50. There are also shown coils $\mathbf{53^1}$ and $\mathbf{54^1}$ cooperating with the projection 49. It will be appreciated that the other coils 53 and 54 are similarly mounted in circular fashion about the rotatable member 47. The coils 53 are connected in series across a power source (FIG. *6a*) so that a current flows continuously. When the projection 49 passes near the core on which a pair of coils 53 and 54 is wound a large change of magnetic flux occurs and a voltage impulse is induced in the secondary coil 54.

FIG. 7 shows an arrangement of two entry magnetic gates $\mathbf{140^{0-9}}$ to $\mathbf{149^{0-9}}$ controlling signal transfer between two tracks of the storage drum. One entry (vertically in the drawing) effects the selection of one column of magnetic cores under the control of the tubes $\mathbf{135^{0-9}}$ and the other entry (horizontally in the drawing) effects selection of one row of magnetic cores under the control of the tubes $\mathbf{136^{0-9}}$, by means of the windings on the magnetic cores. Only that gate is sufficiently energized to be effective which receives a double-energization. In the case shown this allows a selection of any one of 100 cores, by only two ten-fold entry means. The manner in which this arrangement may be used to effect the addition of two decimal digits is described in detail in my co-pending application Ser. No. 432,093.

Selected timed signals are fed by the core arrangement to electronic tubes $\mathbf{137^{0-9}}$ or $\mathbf{138^{0-8}}$ selectively, to record on a drum track by operating the recording signal heads 150 and 151 at selected times according to the control exercised by the gates. FIG. 7 shows one entry being effected by signal heads $\mathbf{31^1}$ and $\mathbf{31^2}$ which sense the track **24*a* and deliver signals to amplifier 41 to influence via the magnetic distributing means $\mathbf{139a/b^{0-9}}$ the control grids of said electronic tubes $\mathbf{135^{0-9}}$. The magnetic distributor 139** is similar in construction to the arrangement shown in FIG. 6*b*. The other entry is controlled by the keyboard, the grids of the tubes $136^{0-9}$ being connected to the cathodes of the tubes $43^{0-9}$ of FIGURE 6*a*.

FIG. 8 shows one arrangement of a cooperation between a storage drum and an output means. The drum has an area 88 for information signals and a track **88*a* for synchronizing signals which latter signals control the electronic distributor 90. The electronic distributor 90** influences the grids of the gas discharge tubes $91^1$–$91^n$ successively in coordination with the sensing of the synchronizing signals, whereby information signals are delivered to the output means only at time instants determined by their relationship with the synchronizing signals. The synchronizing signals may instead of being signals sensed on a magnetizable layer, be signals from some other signal generator coordinated to the rotation of the drum, such as, for example, signals from inductive elements such as shown in FIG. 6*b* operating as a pulse generator.

By means of the synchronized transmission of signals controlling the tubes $91^1$–$91^n$, and by the use of interchangeable connecting means between such tubes and magnets or other electrically controllable means, any desired mechanical or other effect may be obtained at any desired place at any time in dependence on the stored information signals on the drum. In the case shown, magnet coils are energized selectively in dependence on such stored information signals, such coils being part of a parallel-operating printing mechanism.

The circuit shown in FIG. 8 is described more fully in my copending patent application Ser. No. 498,041 now Patent No. 2,972,016 filed Mar. 30, 1955.

Referring now to FIG. 9 selective signal transfer from a record means in the form of a drum to a magnetic tape, or the reverse, is shown. Both record means shown have corresponding synchronizing tracks 92, 93 in which signals transferred from the one and the other have the same timed relationship to information signals also transferred selectively from the one record means to the other. This relationship between synchronizing signals and information signals is preferably obtained when both signals are transferred at the same time.

FIG. 9 shows a recording device in which the signals are stored on a magnetizable drum 100. The recording heads $94^{0-e}$ connected with the key operated switches $95^{0-e}$ of the keyboard, correspond to the recording heads 32 of FIG. 5 in their function. The coils **70*a* and 70*b* and discharge tube 79 in connection with the magnetic yoke 76** are shown in more detail to FIGS. 10*a*, *b*, *c* and *d*. The transfer of signals and of control frequencies from the drum 100 to the tape 101 is effected selectively under any desired control, for instance in dependence on a selected operation of switches $95^{0-e}$ for a selection of tracks and operation of the inductive distributor **70*a*, 70*b* and 76**, for selection of localities within the selected tracks.

The signals are sensed by sensing heads $102^{0-9,\ a-e}$ and transferred via signal heads 36 and pentodes 103 of which only one is shown to the tape 101, whereas the control frequency is sensed by signal head 104 and transferred via pentode 105 and signal head 106 to the synchronization track of the said tape.

The inductive distributor according to FIGS. 10*a*–*d* comprises in stator 77 a circle of ten primary coils $70a^{0-9}$ and ten secondary coils $70b^{0-9}$, the cores **71*a* and 71*b* of which are on their one side connected with each other in pairs by the yokes 72**. FIG. 10*c* shows the side-view and FIG. 10*e* the section on A–B of FIG. 10*c* of the stator. The rotor 73 is fixed on shaft 74 by a key in a defined position relative to the magnetizable drum. It is of starlike form with teeth $76^{0-8}$ and in the example has nine teeth equally spaced so that between the 9 parts of the rotor and between the ten parts of the stator there is a vernierlike displacement by rotor movement in the direction of the arrow 34, which is used for the purpose of the digit value distribution for the digit value signals 0–9 in the different sectors of the record means.

The rotor 73 is fixed by its key 75 on shaft 74 in such a way that in that timing instant, in which e.g. according to FIG. 5*a*, the digit value field 0 is below the gap of the sensing head $31^0$ in track **24*a*, the tooth $76^0$ of the starlike rotor 73 is exactly opposite the cores $71a^0$ and $71b^0$ of the pair of coils $70a^0$ and $70b^0$ connected magnetically by the stationary yoke 72. The reluctance of the magnetic circuit is very reduced at that instant, so that the primary coil $70a^0$ is effectively magnetically coupled to the secondary coil $70b^0$ as in a transformer. A digit value signal "0" recorded on track 24*a*** will be sensed at that instant. For all other pairs of coils there is poor magnetic coupling because they have a high reluctance magnetic circuit. A sensed signal "0" therefore, supplied to all the primary coils $70a^{0-9}$ will generate an appreciable signal only in the effectively coupled secondary coil $70b^0$.

If in the next instant the storage location corresponding to "1" is below the sensing head $31^0$, the magnetic coupling of the coils $70a^1$ and $70b^1$ is effected by the tooth $76^1$. In the timing instant "2" the coils $70a^2$ and $70b^2$ are magnetically coupled via the tooth $76^2$ etc., until, after "9" the inductive distributor begins with "0."

For a better understanding, in FIG. 10*c* there is shown a vernier division, in which in one rotation of the rotor each coil will be effective ten times, giving a total of 100 storage locations in ten sectors. It is evident that when 13 sectors are used, each sub-divided into 40 digit value storage locations, suitable modifications will be made to the rotor and stator. By reason of using the vernier divisions larger coil spacings can be allowed.

As FIG. 10*f* shows, the primary coils $70a^{0-9}$ are connected in series and via transformer 78 to a discharge circuit (not shown) controlled by sensing head $31^0$ (compare FIG. 5*a*). At that instant in which a digit value signal is sensed by the sensing head $31^0$ in track **24*a* an impulse is generated by the amplifier circuit—which is fed to the primary coils $70a^{0-9}$. A movable magnetic tooth 76** serves to effectively energize one of the secondary coils $70b^{0-9}$ through the corresponding primary coil $70a^{0-9}$ so that within the secondary coil a voltage surge is induced, which corresponds to the respective digit value signal "0–0." Such a voltage surge is used for the ignition of one or another of the relay-tubes connected to each secondary coil, for instance gas discharge tubes $70^{0-9}$, by means of which output or storage means can be operated in accordance with the timing of digit value signals.

FIG. 10*a* shows by means of a schematic diagram the control of electronic relay tubes in dependence on information signals contained in one track 175 of a record means, for example a magnetizable tape. Synchronizing signals are contained in another track of the tape within the synchronizing track 174.

In the arrangement of FIG. 10*a* is shown a magnetizable tape having one information track 175 sensed or recorded by signal head 177 and a magnetizable synchronizing track 174 in which the signals are sensed or recorded by means of signal head 176. The arrangement is shown operative for sensing. The synchronizing track 174 contains magnetized areas the beginning of which may be indicated by a start signal 178 and the ending of such an area by a stop signal (not shown), which would be situated in the right hand portion of the tape shown in FIG. 10*a*.

The arrangement of FIG. 10*a* is to show an example of the recording of signals on a tape as being comparable in effect to a punched card. Each area of the tape beginning at start signal 178 on the left side and ending at the not shown stop signal on the right side is to contain all the signals of a punched card e.g. an eighty column punched card. The values are so recorded that the sensing of all the columns of the digit value "9" takes place first and is followed by the sensing of all the columns of digit value "8," then follows digit value "7" and so on, comparable to the passage of the index point rows of a punched card below sensing brushes. To demonstrate the relation between information signals and synchronizing signals there is shown in FIG. 10*a*, within the area 179$^{1-n}$ a group of synchronizing signals one for each column and wherein the whole group of columns 179$^{1-n}$ corresponds to the line "9" of a punched card. Instead of holes, which would be used on punched cards, information signals 180 in the information track of the tape are coordinated to those of the synchronizing signals 179$^{1-n}$ which correspond to the column in which a hole would be punched in a punched card. In FIG. 10*a* such information signals 180 are contained in track 175 in alignment with signals 179$^{2}$, 179$^{9}$, 179$^{11}$, etc. of track 174 indication that a "9" is recorded within the columns 2, 9, 11 and so on.

After a space 173, in which no information signals will be recorded and which corresponds to the moving on of a punched card from one horizontal row to the following horizontal row, the synchronizing signal area 207$^{1-n}$ provided to indicate the columnar significance of information signals within track 175 representing the digit value "8." In this case, signals for the digit value "8" are shown in columns 4, 6 and so on. It is a special feature of the present invention that by the use of synchronizing signals coordinated to indicate the timed or local position of information signals for columns on digit values, a stepwise transport of such tape may be effected without losing the advantage of using synchronizing signals. Another advantage is the easy duplicating possibility for control, duplicating, sorting, selecting tasks and so on, since only two tracks have to be sensed and transferred.

The operation of the sensing arrangement is shown in FIG. 10*a* with electronic distributing means being controlled by the signals in the synchronizing track 174. The sensing head for synchronizing signals is connected to the control grid of pentode 190 which will deliver current pulses when operated by signals sensed from the synchronizing track. The capacitor 191 is therefore charged in steps by the pulses. The voltage across the capacitor is applied to a deflecting plate 185 of the cathode ray tube to deflect the electron beam from electrodes 187$^{1}$ to 187$^{n}$ on screen 186 step by step. There may be 80 electrodes 187, or there may be 10 electrodes used repeatedly eight times for 80 columns. The discharge tube 192 is to discharge the capacitor 191 after each cycle of deflection.

In this case gas discharge tubes 189$^{1}$ to 189$^{n}$ e.g. 80 gas discharge tubes are to be controlled by the information signals within track 175. At the passing of information signals below sensing head 177 such signals are amplified in pentode 182 to deliver signals to the control grid 184 of the cathode ray tube 183. If information signal 180 corresponding to column 2 of the synchronizing area 179$^{1-n}$ is sensed by signal head 177 the cathode ray deflected by the deflection system 185 has reached the electrode 187$^{2}$, so that the amplified information signal delivered to control grid 184 allows beam current to flow to electrode 187$^{2}$. This produces a voltage across the load which effects via coupling capacitor 188$^{2}$ the ignition of discharge tube 189$^{2}$, whereas the preceding relay tube 189$^{1}$ remains ineffective as within this column no information signal 180 has been sensed. After the running through of the tape through the information area synchronized by the synchronizing signals 179$^{1-n}$ all those electronic relay tubes 189$^{1-n}$ are ignited which correspond to the said columns 2, 9, 11 and so on in which information signals are contained to indicate "9," as this area of the tape synchronized by the signals 179$^{1-n}$ is to contain all the signals for the digit value "9."

During the sensing of the gap 173 the electronic tubes 189$^{1-n}$ are de-ionized so that within the sub-area of the tape synchronized by the signals 207$^{1-n}$ those of the relay tubes 189$^{1-n}$ may be ionized anew which correspond to information signals representing digit values "8" and so on.

FIG. 10*b* shows a magnetizable rotatable record means to which the sensed signals from the synchronizing track 174 and the information track 175 may be transferred for a repeated or cyclic use.

Such cyclically operable storage means may be a magnetizable drum 204 fixed on shaft 198. The drum 204 may be driven by motor 193 via a start-stop friction clutch 194 but is normally arrested by engagement of projection 197 by armature 196 of the relay 195. If the relay 195 is energized in dependence on for example starting signal 178 (FIG. 10*a*) via an amplifier and with the distributing means known from start-stop teletyping, the friction clutch 194 will rotate the magnetizable drum or disc 204 for one rotation.

This friction clutch corresponds to the clutch 9 of FIG. 2. The shaft 198 is used to drive the tape feeding mechanism. This shaft carries a commutator 119, which is driven through a reduction gear from the shaft carrying the drum 204 in the manner described in detail in my co-pending application, Ser. No. 432,295 now abandoned, which also describes the manner in which the gas tubes 189 control the energization of the heads 203 by means of a magnetically operating distributing switch.

The signals of each tape area are recorded in two parallel tracks, namely one synchronizing track and one information track via the signal head 203$^{s}$ and 203$^{0-9}$.

In FIGS. 11*a*–11*c* is shown an arrangement for selecting a desired part of a track by comparing a preset address registration with addresses recorded on the drum.

The sensing head 120 of the tube 109 is arranged over the address signal track 124 and sensing head 121 of tube 112 over the address signal track 125, sensing head 122 of tube 119 over the address signal track 126, and so on (FIG. 11*b*).

If tube 109 is not operative the pentode 107 is held non-conducting by a low screen voltage, whereas pentode 108 is conductive, the voltage of the screen grid of pentode 107 being provided by the voltage drop across cathode resistances 127, 128 of the tube 109, whereas the suppressor grid of pentode 108 has the same potential as the cathode of this tube as long as the tube 109 is not operative. As soon as the tube 109 becomes operative the pentodes 107 and 108 change with respect to their operation, i.e. pentode 107 is conductive while pentode 108 is non-conducting, pentode 107 having received its screen grid voltage, whereas the cathode of pentode 108 has become positive with regard to its suppressor grid potential.

Switch 116 has either position *a* or position *b* depending on whether the first element of the address combination requires a "signal" (position *a*) or "no signal" (position *b*) position. The switch 116 may be the contact of an electro-magnetic relay or may be a manually operated switch.

Signals sensed from an information storage area by sensing head 129 will pass to the switch 116 only if tube 109 is operative, i.e. if pentode 107 is conductive. In position *b* of the switch 116 no signal transmission from sensing head 129 is possible in spite of pentode 107 being conductive; the necessary continuity of the circuit for such sensed information signals being interrupted by means of said switch 116.

The various possibilities for continuity and discontinuity in the signal transmission circuit will be understood from the diagram at the top of FIG. 11*a*, where in each unit of the chain of gates there are two switch elements one of which is comprised by the electronic tubes such as the tubes 107, 108, 109 in the first gate shown, and the other of which switch elements comprises switches 116 etc.

Beginning from the left of FIG. 11*a*, information signals entering either chain at the sensing heads 129, 130 pass the first gate of the chain if the electronic switch 107, 108 coincides with the selecting switch 116 which has been preset (being for example in the upper position 116a). Such coincidence takes place only during that time period of the rotation of the storage when both the switches are in the upper or both in the lower position, in the case shown, if the electronic switch is in position 107, that is when pentode 107 is conducting in dependence on the tube 109 being operative. The signals sensed by signal head winding 129 arrive at the grids of the pentodes 110, 111 which pentodes are connected in parallel via capacitors.

The sensing heads 129, 130 are separate windings of a single head.

Information signals sensed by the sensing heads 129, 130, after having passed through the chain of combination switches may be transferred to another storage device, which may be a magnetizable storage, or a relay tube storage, or a cathode ray storage, the deflection of the cathode ray being in synchronism with the original storage in dependence on synchronizing signals sensed from that storage or from another signal generator, which controls the relative movement between the storage and the sensing means.

When a transfer to another magnetic storage is to be effected, synchronizing signals for the information signals will be taken either from the same track in the information storage, e.g. start-stop signals or distributing pulses for one or more digit values and/or denomination values, or from a separate synchronizing track the signals of which have a defined position relatively to signals in the information track.

The same switchable selection conditions obtain in each successive gate in the chain. For example, in the second gate illustrated the pentode 111 being conductive since tube 112 is not operative and coinciding with the relay switch 117 in the lower position shown, the signals are passed to the third gate of the chain, and so on.

With a 5-stage binary selection device there are in each cycle of operation 32 ($2^5$) possibilities of selecting different areas within each track of the storage, each area containing multi-column information in for example 50–100 column positions. If one fourth binary stage is added to the selection device the number of selection possibilities would be 64 ($2^6$).

For an easier understanding of the method of selection, the tube 109 is shown as a gas discharge tube with a capacitative anode load operating so that the pentode 107 is rendered operative only for the minimum period between successive signals. The information signals induced in signal heads 129, 130 are always effective at a position corresponding to the middle of such an interval.

Within the second group of pentodes 110, 111 controlled by tube 112 the same process takes place, that is, the signals transmitted by signal heads 129 and 130 are only further transmitted if tube 112 is non-operative, that is when pentode 111 is open and the switch 117 is in position b.

According to FIG. 11b, the control of the alternate opening and blocking of pentodes 107, 108 is shown by way of example as a signal sequence illustrated diagrammatically at 124. Pentode 107 is understood to be conducting during the period represented by the upper half of the track 124 in each rotation and "non-conducting" during the period represented by the lower half, i.e., pentode 107 is conductive during the first 180° of one rotation, whereas during the next 180° of a rotation pentode 108 is conductive. Similarly, pentode 110 is conductive and pentode 111 is non-conductive from 0 to 90° and from 180 to 270° in each cycle of track 125, whereas it is non-conducting and pentode 111 is conducting from 90° to 180° and from 270° to 360° in each cycle.

This automatic opening and closing of the electronic switches during each cycle brings about the combination of automatically opened and "blocked" switches with the preset positions a and b of the switches 116, 117, 118 or corresponding electronic or other relays, switching panels, keyboard contacts or the like.

To avoid too strong amplification of the signals produced in the sensing heads 129 and 130, transmission to the control grid of the next tube is provided by means of a tapping point of the respective anode resistor. In the drawing, only the first two and the last of the chain of switches is shown.

There may of course be any number of selection groups in the chain. Thus, only those signals from the sensing heads 129 and 130 are transmitted through the whole chain of selection group switches, when the electronic switches, in combination with the position of the preset switches establish a continuous circuit.

In the moment at which the combination of the switches 116, 117, 118 and so on corresponds to the sensed combination of signals the information signals pass from the sensing head 129 or 130 through the chain to control further means, such as converters for dot and line-printers and the like as set forth in my copending patent application Ser. No. 498,055, now Patent No. 2,982,951, filed Mar. 30, 1955.

The address pattern of FIG. 12c may equally well be produced by magnetic projections from the drum surface, or by a pattern of black and white areas suitable for sensing by photo-electric cells instead of magnetic heads.

What I claim is:

1. A selective data storage arrangement comprising first magnetic data signal storage means including reading means delivering electrical data signals under control of magnetic data sigals read from said first magnetic data signal storage means; second data signal storage means including writing means operative under control of electrical data signals and adapted to write data signals into said second data signal storage means; transmitting means interconnecting said reading and writing means and adapted to transmit selectively electrical data signals from said reading to said writing means; electronic gating means in said transmitting means comprising at least two electronic gating elements, the first electronic gating element of said two electronic gating elements being in conductive condition only, if a first address control means and a first compare control means are in a corresponding switching position; said first address-control means actuating one control element of said first gating element in dependence upon actuation by electric data bit signals representing the first bit order of an address data word having at least two bit orders; said first compare-control means actuating a second control element of said first gating element in dependence upon actuation by electric data bit signals representing the first bit order of a compare data word having at least two bit orders; the second electronic gating element of said two electronic gating elements being in conductive condition only, if a second address control means and a second compare control means are in a corresponding switching position; said second address-control means actuating one control element of said second gating element in dependence upon actuation by electric data bit signals representing the second bit order of an address data word having at least two bit orders; said second compare-control means actuating a second control element of said second gating element in dependence upon actuation by electric data bit signals representing the second bit order of a compare data word having at least two bit orders; wherein said electronic gating means is conductive for the transmission of electrical data signals from said reading means to said writing means in a determined time period only if during said time period both said first and second electronic gating elements are in conductive condition.

2. A selective data storage arrangement according claim 1, wherein said electric data bit signals representing the bits of address data words are delivered from reading means which are controlled by signals on said magnetic data signal storage means.

3. A selective data storage arrangement according claim 1, wherein said electric data bit signals representing the bits of compare data words are delivered from input means.

4. A selective data storage arrangement according to claim 1, in which said first magnetic data signal storage means is a cyclic magnetic storage means.

5. A selective data storage arrangement according to claim 1 is a cyclic magnetic data storage means in which the data signals are stored in a plurality of data tracks of a magnetizable storage medium and wherein there is a relative movement between said storage medium and signal heads, and wherein said reading means are one or more signal heads being relatively moved to said storage medium in the direction of said data tracks.

6. Data processing means comprising cyclic data storage means in which data bits representing digital values of a plurality of numbers have a relative movement to a plurality of transducing means for reading and writing such data bits; a plurality of electronic gating means coordinated to a number of said transducing means, said gating means being actuated by electronic switching means which are operative under control of electrical signals representing digital data; said plurality of transducing means being positioned at such distances from each other in the path of said relative movement of data bits to such transducing means that at a given time instant data bits of various digital significance are in operative relationship to said plurality of transducing means; stationary data storage means representing digital data by retaining a plurality of switching elements in a first or second switching position; wherein the significance of the data bits to be transferred by said transducing means is determined by the actuation of a selected electronic gating means under control of said electrical signals representing digital data.

7. Data processing means according claim 6, wherein the actuating of a selected electronic gating means effects a shifting of selected ones of said data bits with respect to their cyclic movement changing hereby their digital significance.

8. A selective data storage arrangement comprising stationary storage means representing digital data by retaining a plurality of switching elements in a first or second switching position; each of said switching elements being coupled to one conductor of a first group of conductors and to one conductor of a second group of conductors; cyclic data storage means in which data bits representing digital values of a plurality of numbers have a relative movement to transducing means for reading and writing such data bits; pulse generating means selectively energizing at a given time instant a selected conductor of said first group of conductors; pulse responsive means coupled to said stationary storage means and adapted to be actuated by electrical signals received from said stationary storage means at determined time instants and to energize said transducing means for writing data bits into the cyclic storage means; wherein said pulse responsive means are actuated by electrical signals received at a given time instant at a selective energization of a selected conductor of said first group of conductors by said pulse generating means in dependence upon whether one of said switching elements coupled to said selected conductor is in its first or second switching position.

9. Selective data storage arrangement, comprising first selective data storage means storing data bits of a plurality of digital data including reading means responsive to such stored digital data and adapted to deliver electrical data signals representing such data; a first group of conducting means, each of which is adapted to be energized selectively by first selective switching means; a second group of conducting means each of which is adapted to be energized selectively by second selective switching means; a plurality of magnetizable elements adapted to have a first and a second state of magnetization in dependence upon whether it is energized by one or by two of conductors to which it is coupled, and of which each element is coupled to one conductor of said first group of conductors and one conductor of said second group of conductors; a third conducting means coupled to said magnetizable elements and responsive to said first or second state of magnetization of said elements; first transfer means transferring selected electrical data signals in a determined first time period from said reading means to said first switching means to actuate selected ones of said first switching means adapted to energize a selected one of said first group of conducting means, and to said second switching means to actuate selected ones of said second switching means adapted to energize a selected one of said second group of conducting means; second selective data storage means storing data bits of a plurality of digital data including writing means responsive to electrical data signals representing digital data and adapted to store such digital data in said second selective data storage means; second transfer means transferring selected electrical data signals from said third conducting means to said writing means; wherein the data representing signals are transferred in said second transfer means from said third conducting means to said writing means in determined second time instants successive to said first time period in which data representing signals were transferred from said reading means to said first and second switching means; and wherein the data representing signals transferred through said second transfer means from said third conducting means coupled to said magnetizable elements and responsive to said first or second state of magnetization of said elements to said writing means dependent upon whether the magnetizable elements selected for reading out at that time instant are in their first or second states of magnetization.

10. Selective data storage arrangement according claim 9, wherein at least one of said two selective data storage means is a data storage means in which data signals are stored in signal tracks generated during a relative movement of a magnetizable signal carrier to signal heads.

11. Selective data storage arrangement according to claim 10, wherein at least one of said two selective data storage means is a cyclic magnetizable data storage.

References Cited

UNITED STATES PATENTS

| | | | |
|---|---|---|---|
| 2,850,719 | 9/1958 | La Manna | 340—173 |
| 2,982,470 | 5/1961 | Evans | 235—61.6 |
| 3,102,997 | 9/1963 | Dirks | 340—172.5 |
| 3,154,770 | 10/1964 | Schwab et al. | 340—174.1 |

ROBERT C. BAILEY, *Primary Examiner.*

GARETH D. SHAW, *Assistant Examiner.*